United States Patent [19]

Hoke

[11] Patent Number: 5,041,043

[45] Date of Patent: Aug. 20, 1991

[54] ADJUSTABLE HEIGHT PUSH TOY

[75] Inventor: Thomas C. Hoke, Natick, Mass.

[73] Assignee: TCA Group, Inc., Natick, Mass.

[21] Appl. No.: 559,170

[22] Filed: Jul. 27, 1990

[51] Int. Cl.⁵ .................... A63H 33/02; A63H 5/00; B62B 3/00; A63G 13/00

[52] U.S. Cl. .................... 446/452; 446/440; 446/412; 280/828; 280/278; 280/47.11; 135/75

[58] Field of Search ............ 446/451, 452, 453, 450, 446/440, 431, 411, 412, 7, 29, 487; 272/1 D; 135/75; 280/828, 278, 287, 47.11

[56] References Cited

U.S. PATENT DOCUMENTS

| | | | |
|---|---|---|---|
| 2,260,679 | 10/1941 | Neilson | 446/451 |
| 2,647,343 | 8/1953 | Zileri et al. | 446/450 |
| 2,707,963 | 5/1955 | Goynes | 280/47.11 X |
| 3,933,373 | 1/1976 | Gammelgaard | 280/287 X |
| 4,333,260 | 6/1982 | Hawkins | 446/450 |
| 4,531,751 | 6/1985 | Todokoro | 280/828 |
| 4,733,682 | 3/1988 | Ellena | 135/75 X |
| 4,865,337 | 9/1989 | Disler et al. | 280/287 X |
| 4,911,675 | 3/1990 | Rogers | 446/485 X |

FOREIGN PATENT DOCUMENTS

| | | | |
|---|---|---|---|
| 0300650 | 1/1989 | European Pat. Off. | 280/278 |
| 141331 | 4/1935 | Fed. Rep. of Germany | 446/451 |
| 2445161 | 8/1980 | France | 446/451 |

Primary Examiner—Robert A. Hafer
Assistant Examiner—D. Neal Muir
Attorney, Agent, or Firm—Wolf, Greenfield & Sacks

[57] ABSTRACT

The support member of a motorcycle simulation push toy which connects the wheel to the handlebars is fashioned from a pair of telescoping pieces so that the length of the support member can be adjusted. The support member can be fixed at several predetermined lengths by means of a plurality of through-bolts and nuts which securely fasten the telescoping pieces in a particular position.

5 Claims, 5 Drawing Sheets

ADJUSTABLE HEIGHT PUSH TOY

FIELD OF THE INVENTION

This invention relates to a child's push toy of the type which simulates a motorcycle.

BACKGROUND OF THE INVENTION

There have existed numerous conventional push toys for children which have taken various forms, such as shopping carts, lawn mowers, or various animals, both real and fantastic, including horses, unicorns, etc.

Recently, a popular push toy has become available which mimics a motorcycle. The toy consists of a single wheel attached to an upright support structure to which a pair of "handlebars" with rotatable handgrips and a console are attached. The console may have various dials, gauges and switches that simulate the dashboard of a real motorcycle.

In operation, the child holds the handlebars of the unit in front of him with the wheel resting on the ground. The child then rolls the unit along the wheel while pretending that he is operating a motorcycle. The motorcycle fantasy may be enhanced by providing a motor-like sound, which may be responsive to twisting of the handgrips in the manner in which a real motorcycle engine responds in response to actuation of a handgrip throttle. In addition, the console may contain a headlight, flashing turn signal lights, or other devices which are normally found in a real motorcycle.

The prior art motorcycle push toy is popular with both very young and older children. One significant problem, however, with the design is that it cannot easily accommodate children of different heights. The design of the toy necessitates that its length be closely matched to the height of the child since the child must hold the handlebars while the wheel rests on the ground. In order to comfortably use the device, the handlebars must be located at approximately the height of the child's waist and in order to adapt the toy to a many children as possible, the length of the support member which connects the wheel to the console must be a compromise or average. Consequently, taller children may have difficulty using the toy and, although the toy may be of suitable height for a younger child, as the child grows, the toy eventually becomes too short to comfortably use.

Accordingly, it is an object of the present invention to provide a motorcycle simulation push toy in which the height between the handlebars and wheel can be easily adjusted.

It is another object of the present invention to provide a motorcycle simulation push toy in which the height of the toy can be adjusted to accomodate children of several different heights.

It is still another object of the present invention to provide a motorcycle simulation push toy in which the height adjustment mechanism can be molded from the same materials from which the toy is constructed.

It is yet another object of the present invention to provide a motorcycle simulation push toy in which the adjustment mechanism is sturdy enough to function in the normal operating environment.

SUMMARY OF THE INVENTION

The foregoing problems are solved and the foregoing objects are achieved in one illustrative embodiment of the invention in which the support member of a motorcycle push toy which connects the wheel to the handlebars is fashioned from a pair of telescoping pieces so that the length of the support member can be adjusted. The support member can be fixed at several predetermined lengths by means of a plurality of through-bolts and nuts which securely fasten the telescoping pieces in a particular position.

Consequently, the height of the handlebars above the ground can be easily adjusted by removing the through-bolts from the support member, sliding the pieces apart and re-inserting the bolts to make the assembly rigid at the new height.

DETAILED DESCRIPTION OF THE PREFERRED EMBODIMENT

Figure 1:
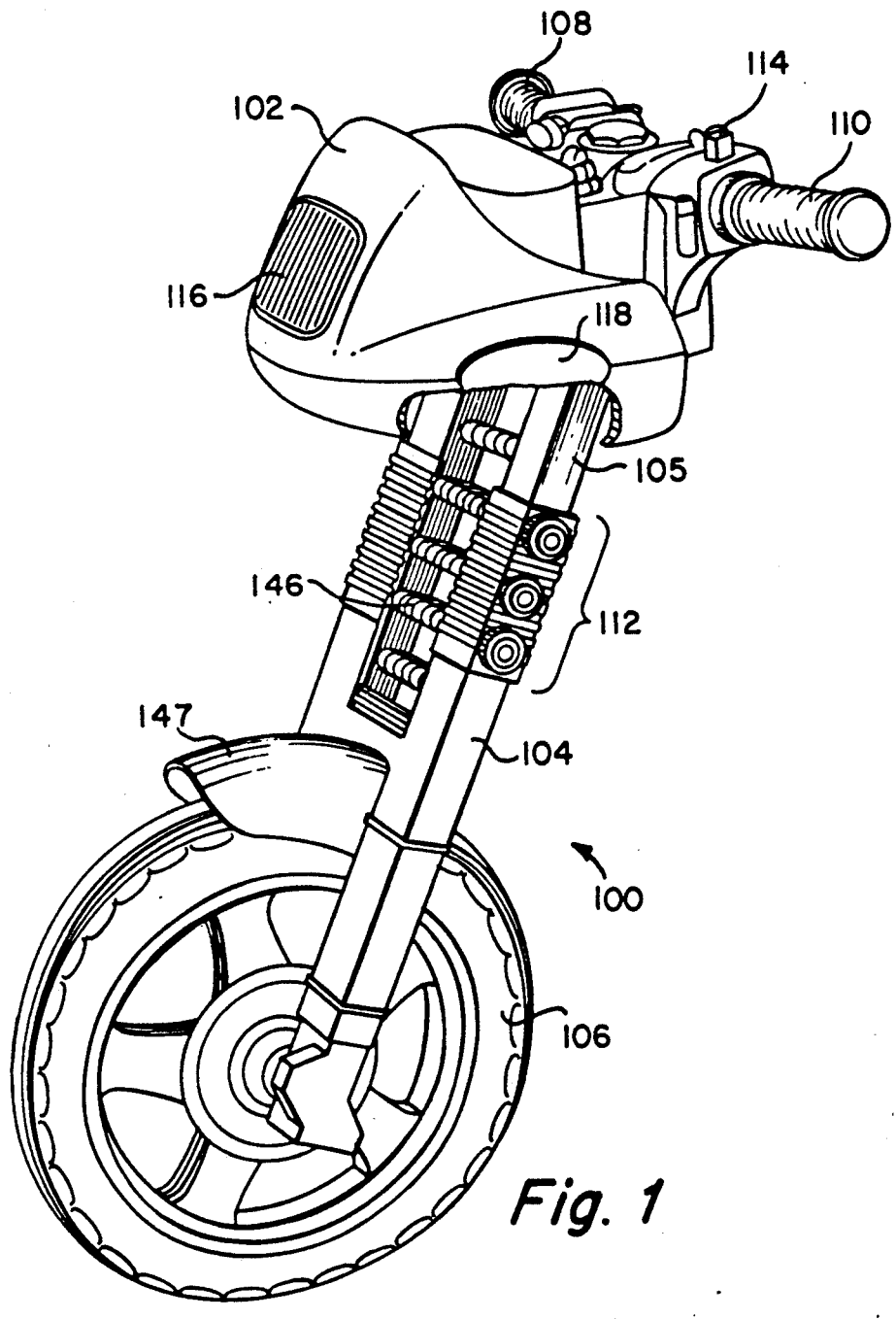
FIG. 1 shows a perspective view of the inventive motorcycle pushtoy.

FIG. 1 is a perspective view of a preferred embodiment 100 of the inventive adjustable height toy. The toy consists of a console unit 102 which is attached by means of support pieces 104 and 105 to a wheel 106. A pair of handlebars 108 and 110 are mounted to console 102 so that the toy can be rolled along on wheel 106 when a child holds handlebars 108 and 110. Console 102 may also be provided with a variety of fantasy-enhancing features such as a headlight 116 or turn signals 118, which are controlled by means of switches and levers 114. Other details, such as fender 147, may be added to increase the realism of the simulation.

As will hereinafter be described, support pieces 104 and 105 telescope together and can be fastened together to form a rigid support member with several different lengths by means of an adjustment section 112, in which a plurality of through bolts are positioned to fasten pieces 104 and 105 together. In the illustrated embodiment, the bolts are enclosed by a plurality of channels 146, which rigidly separate the side rails of support pieces 104 and 105.

Figure 2:
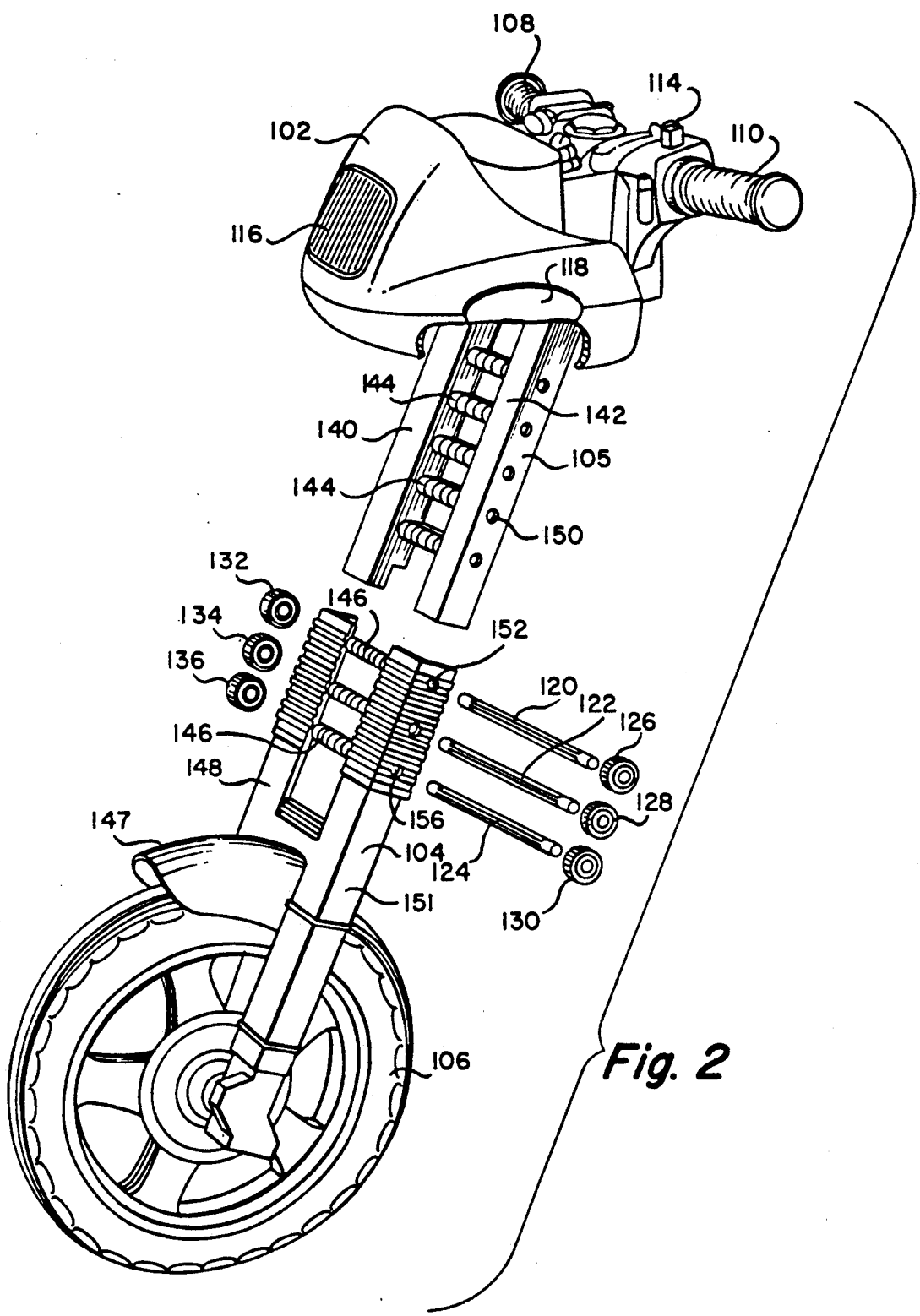
FIG. 2 is an exploded perspective view showing the through-bolts and corresponding nuts and the support adjustment section in detail.

FIG. 2 is an exploded diagram of FIG. 1 showing in more detail adjustable section 112 of the support pieces 104 and 105. The elements of FIG. 2 and subsequent figures which are equivalent to those of FIG. 1 have been given equivalent numeral designations. In particular, support piece 105 consists of two side rails 140 and 142 which are separated by a plurality of cross ties 144. As will hereinafter be described, cross ties 144 enclose holes 145, through which bolts 120-124 can be inserted to lock support member 105 and support member 104.

In a similar manner, support member 104 consists of two side rails 148 and 151, which pass on either side of wheel 106. Rails 148 and 151 are held separated at their upper ends by means of cross ties 146. Cross ties 146 are unlike cross ties 144 in that they do not actually enclose holes 152, but merely lie in front of holes 152 (and cross ties 144 when the support pieces are assembled) for improved appearance.

Also shown in FIG. 2 are through bolts 120-124, which are used to lock together support members 104 and 105. Bolts 120-124 are preferably provided with threaded ends onto which nuts 126-136 can be threaded to hold bolts 120-124 in place after the toy has been assembled.

Figure 3:
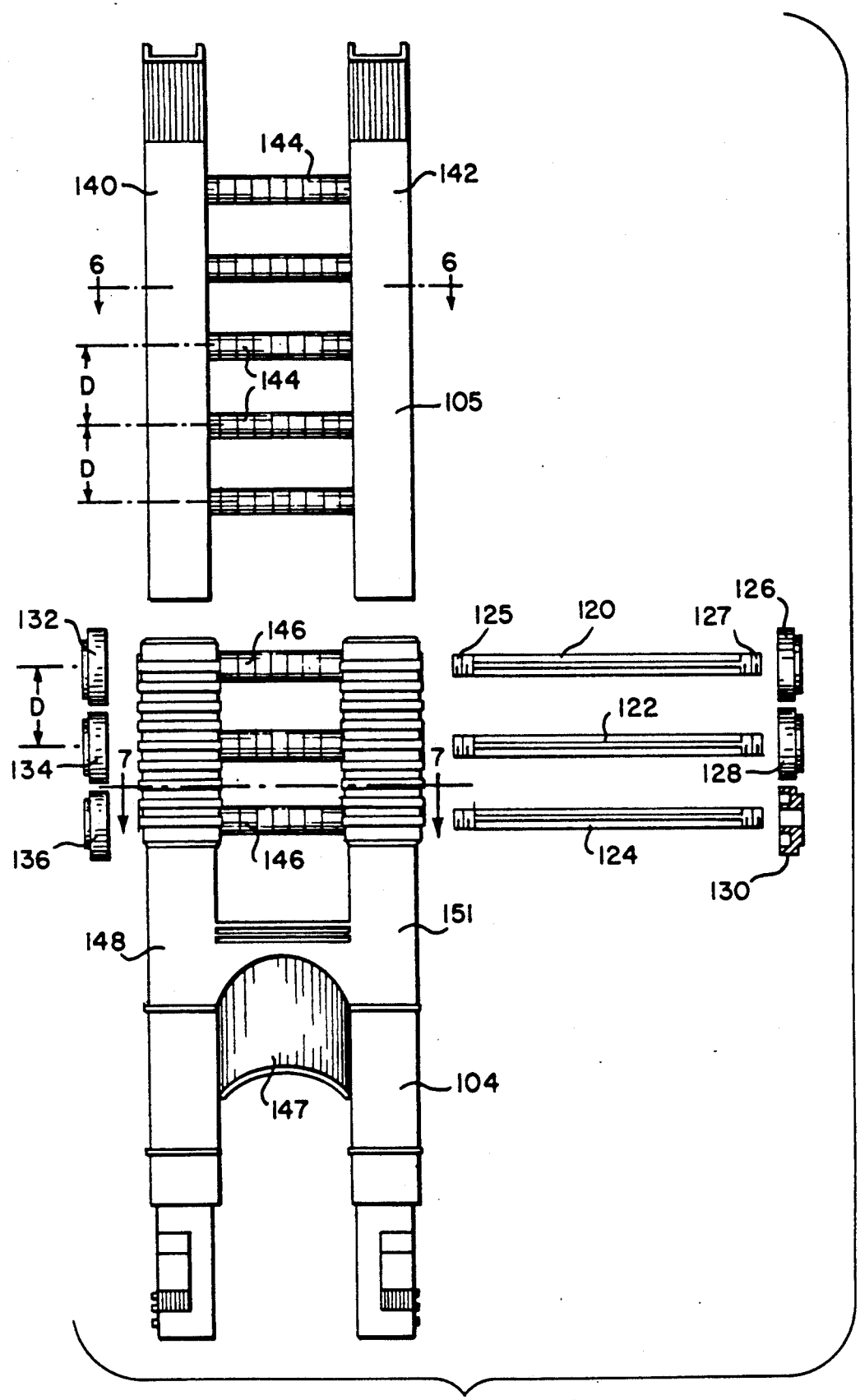
FIG. 3 is a front view of the support member detailing the adjustable section and the through bolts and nuts.

FIG. 3 shows a front view of support pieces 104 and 105. As can be more clearly seen in FIG. 3, cross ties 144, which separate rails 140 and 142 of support piece 105, are equally spaced by a distance D. Cross ties 146 which separate rails 148 and 151 of support piece 104 are also spaced by distance D. Consequently, when support piece 105 is slid into support piece 104, the two pieces can be positioned at three distinct relative positions at which holes 150 (in piece 105) and holes 152 (in piece 104) are in alignment. The three relative positions allow the support member to assume three distinct lengths. Of course, in accordance with the principles of the invention, support member 105 may be elongated and additional cross ties 144 may be added to provide additional length adjustments.

After the support pieces 104 and 105 have been placed in the proper relative position to obtain the necessary height adjustment, bolts 120-124 are inserted and nuts 126-136 are threaded onto the ends of bolts 120-124 to complete the assembly.

Figure 4:
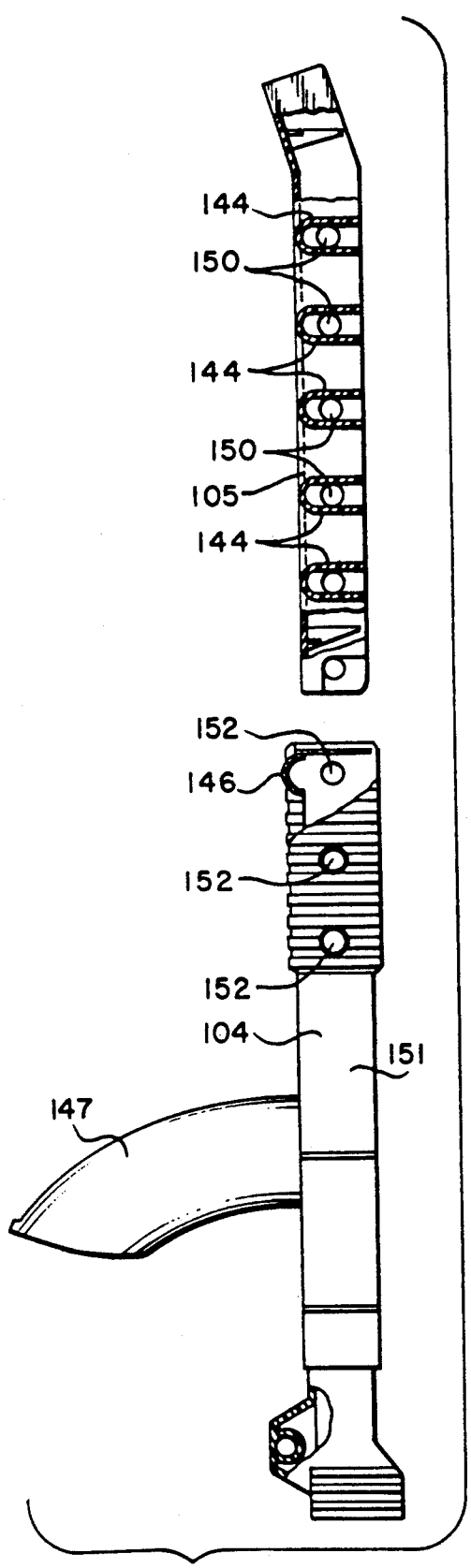
FIG. 4 is a side view of the support member in which the upper part of the support member has been broken away to show the internal molded construction.
Figure 5:
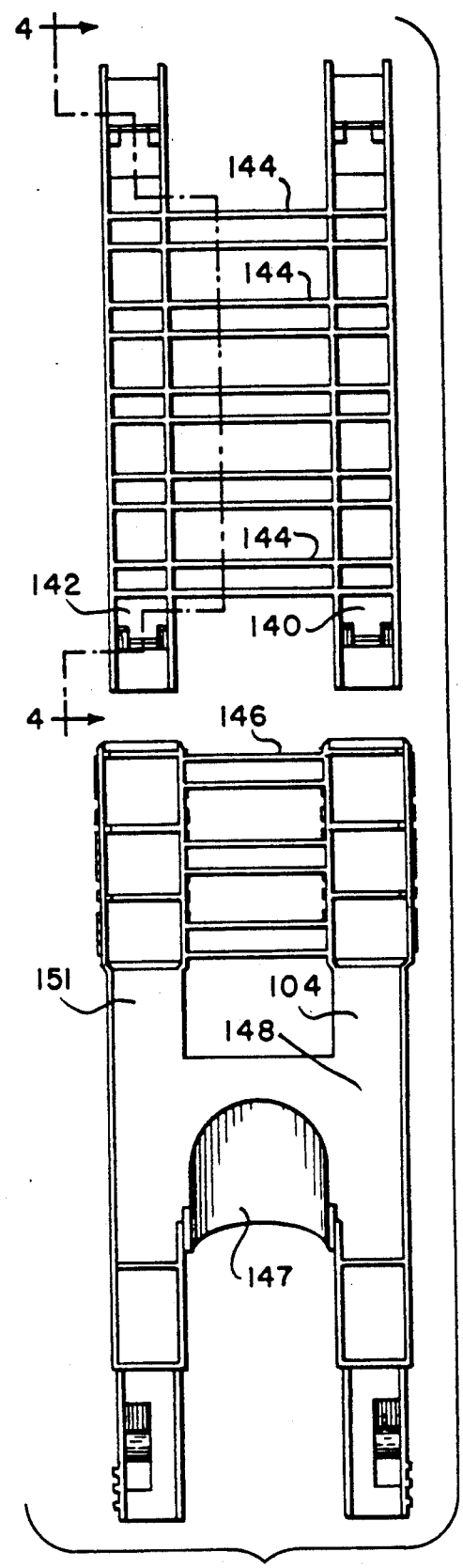
FIG. 5 is a back view of the support member illustrating a preferred molding configuration.

FIG. 4 and 5 show side and back views of the support pieces 104 and 105, respectively, and illustrate a preferred method of molding the pieces to obtain strength and rigidity of the units. In particular, as shown in the upper portion of FIG. 4, which is a partial cross-sectional view of support member 105 taken along section lines 4—4 in FIG. 5, each of cross ties 144 is arranged with a U-shaped cross-section which surrounds hole 150. In this manner, bolts 120-126 are enclosed and hidden by ties 144 and the overall appearance of the unit is enhanced. As shown in the lower portion of FIG. 4, cross ties 146 are flat moldings which lie in front of holes 152.

Figure 6:
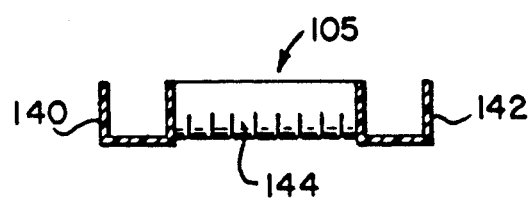
FIG. 6 is a cross sectional view of support piece 105 taken along the section line 6—6 in FIG. 3.
Figure 7:
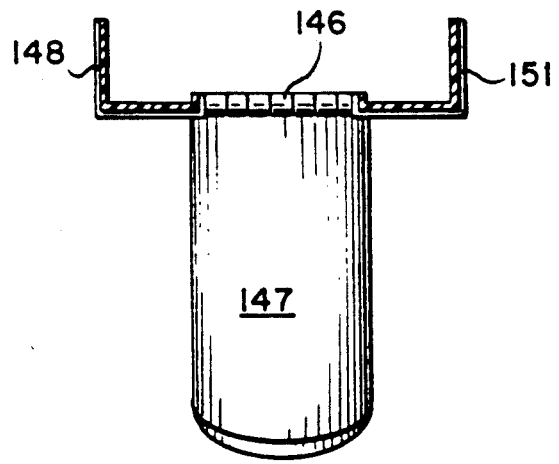
FIG. 7 is a cross sectional view of support piece 104 taken along the section line 7—7 in FIG. 3.

The side rails 140 and 142 of support member 104 are molded in a U-shaped or a hollow rectangular configuration as shown in FIG. 6, which is a cross-sectional view taken along section line 6—6 in FIG. 3. In a similar manner, as shown in FIG. 7 which is a cross sectional view taken along section line 7—7 in FIG. 3, the side rails 148 and 151 of support member 104 are molded in a U-shaped or rectangular cross section of slightly larger dimensions so that support piece 105 can be slid into support piece 104 in a telescoping manner.

Although only one illustrative embodiment has been shown in the inventive adjustable push toy, other modifications and changes will be immediately apparent to those skilled in the art. These modifications and changes are intended to be covered by the following claims.

What is claimed is:

1. A motorcycle simulation push toy having adjustable height comprising:
   a pair of handlebars adapted to be gripped by a user;
   a console having manually-operated switches and lights attached to said handlebars;
   a wheel;
   a support member rotatably attached to said wheel and fixedly attached to said handle bars and to said console, said support member comprising;
   a first piece having a first rail and a second rail and a plurality of first cross ties rigidly connecting said first rail in a position parallel to said second rail, said first piece having a plurality of first holes therethrough in a direction parallel to said plurality of first cross ties; and
   a second piece having a third rail and a fourth rail and a plurality of second cross ties rigidly connecting said third rail in a position parallel to said fourth rail, said second piece having a plurality of second holes therethrough in a direction parallel to said plurality of second cross ties, said first support member piece sliding into said second support member piece in a telescoping fashion, said first holes and said second holes being arranged so that at least some of said first holes align with at least some of said second holes at a plurality of different relative positions of said first support piece relative to said second support piece;
   a plurality of through-bolts passing through said first holes and said second holes for rigidly fastening said first support piece and said second support piece together at a plurality of relative positions; and
   a plurality of nuts threaded onto said plurality of bolts for rigidly fastening said first support member piece to said second support member piece.

2. A motorcycle simulation push toy according to claim 1 wherein each of said plurality of first cross ties encloses one of said plurality of bolts.

3. A motorcycle simulation push toy according to claim 1 wherein said first and said second rails have rectangular cross-sections.

4. A motorcycle simulation push toy according to claim 3 wherein:
   said third rail has at least one rectangular surface; and
   said fourth rail has at least one rectangular surface.

5. A motorcycle simulation push toy according to claim 1 wherein said first, said second, said third and said fourth rails each have at least one rectangular surface.

* * * * *